Oct. 17, 1967   G. L. CAMPBELL   3,347,512
LOCKING DEVICE FOR ADJUSTABLE VEHICLE SEATS
Filed Oct. 18, 1965                2 Sheets-Sheet 1
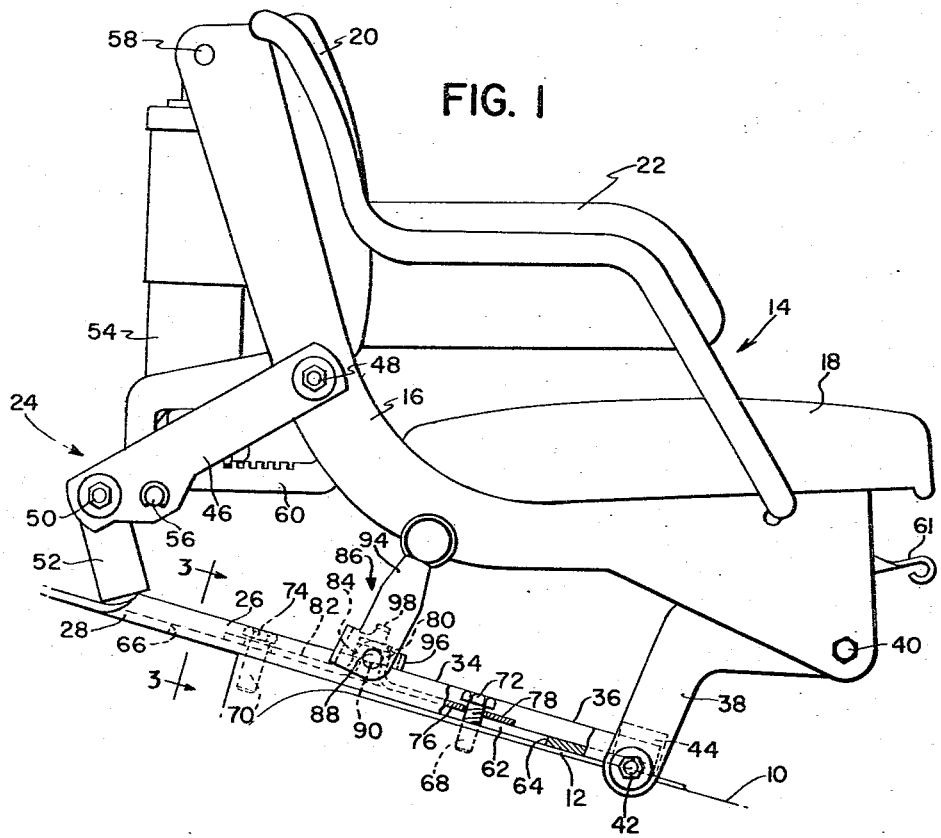
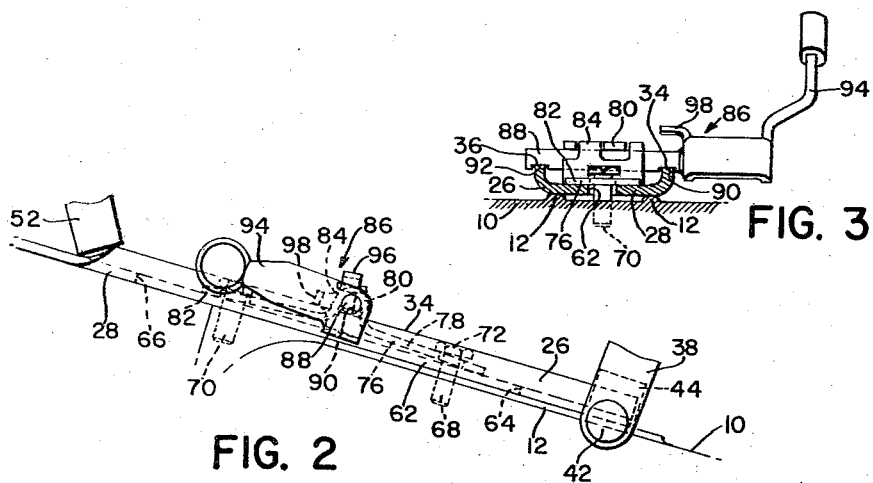
INVENTOR.
G.L. CAMPBELL
BY
John M Nolan
ATTORNEY Oct. 17, 1967  G. L. CAMPBELL  3,347,512
LOCKING DEVICE FOR ADJUSTABLE VEHICLE SEATS
Filed Oct. 18, 1965  2 Sheets-Sheet 2

INVENTOR.
G.L. CAMPBELL
BY
John M. Nolan
ATTORNEY

# United States Patent Office 3,347,512
Patented Oct. 17, 1967

3,347,512
LOCKING DEVICE FOR ADJUSTABLE
VEHICLE SEATS
Gary L. Campbell, Waterloo, Iowa, assignor to Deere & Company, Moline, Ill., a corporation of Delaware
Filed Oct. 18, 1965, Ser. No. 496,957
10 Claims. (Cl. 248—429)

ABSTRACT OF THE DISCLOSURE

A tractor seat structure slidable on a tractor-mounted supporting structure in a fore-and-aft, upwardly and rearwardly inclined direction, and having a locking device actuatable by the operator from the seat to selectively and releasably lock the seat structure to the supporting structure in any desired fore-and-aft position, the seat structure also including parallel-type linkage means to permit swinging of the seat to a rearward position wherein it does not interfere with the operator during stand-up operation of the tractor.

---

This invention relates to an adjustable seat for a vehicle, such as an agricultural tractor or the like, and more particularly to a locking device for maintaining the seat in any selective fore-and-aft position of adjustment.

The locking device has particular utility for use on a tractor seat such as described in the assignee's copending U.S. application, Ser. No. 443,510, filed Mar. 29, 1965, now U.S. Patent number 3,304,044. While the present invention will be described for use on the seat described in said application, the locking device could be utilized in other similar seats.

The seat described in said patent application is swingable rearwardly and upwardly, in order that it will not interfere with the operator during stand-up operation of the vehicle, and also includes means for varying the resiliency of the seat according to the weight of the operator. In addition, the entire seat is slidable upwardly and rearwardly on the supporting structure to vary the distance between the seat and the controls according to the preference of the individual operator. The seat in said copending application is locked in its selected fore-and-aft position by means of bolts, which, when tightened, anchor the seat to the supporting structure, the fore-and-aft adjustment being accomplished by loosening the bolts, sliding the seat to its new position, and retightening the bolts. This procedure is, of course, laborious and time-consuming, and generally requires a wrench or special tool. Consequently, the fore-and-aft adjustment of the seat is often neglected.

According to the present invention, the seat is releasably maintained in its selected fore-and-aft position by a novel locking mechanism which can easily be actuated by the operator while sitting on the seat without the use of special tools.

More specifically, an object of the invention is to provide a cam-type locking mechanism actuated by a lever, which is easily manipulated by the vehicle operator from the seat.

Still another object is to provide such a locking mechanism which is simple and inexpensive to manufacture and maintain.

These and other objects of the invention will become apparent from the following detailed description and accompanying drawings wherein:

FIG. 1 is a side elevation view of a tractor seat, including the locking mechanism, which is shown in an unlocked condition.

FIG. 2 is a side elevation view similar to FIG. 1 with most of the seat being omitted and showing the locking mechanism in a locked condition.

FIG. 3 is a section viewed along the line 3—3 of FIG. 1.

Figure 4:
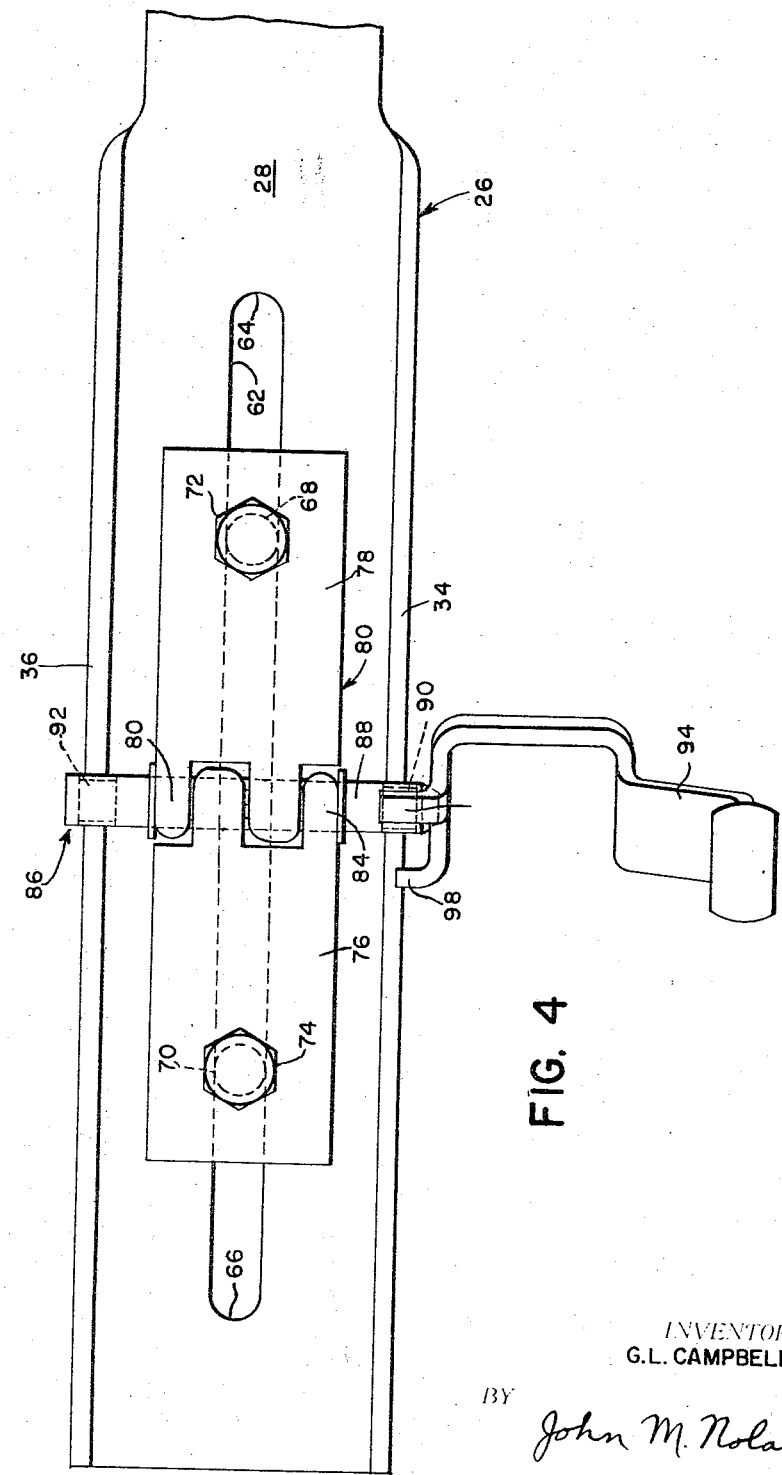
FIG. 4 is an enlarged plan view of the locking mechanism in an unlocked condition.

The numeral 10 represents a supporting structure, which, in the case of an agricultural tractor, runs in a generally fore-and-aft direction rearwardly from an operator's station or platform at which the vehicle controls are located. The supporting structure 10 includes a pair of parallel, fore-and-aft, upwardly and rearwardly inclined ribs or rails 12 on its upper surface.

The seat is designated generally by the numeral 14 and includes a C-shaped frame 16 which carries a seat cushion 18, a back cushion 20, and padded armrests 22. The seat 14 is supported above the supporting structure 10 by a mounting mechanism, indicated generally by the numeral 24, which includes a fore-and-aft channel-shaped member 26 slidable rearwardly and upwardly or downwardly and forwardly on the rails 12. The channel-shaped member 26 has a relatively flat horizontal bight portion 28 and right and left upper edges 34 and 36.

A pair of bell crank shaped front links 38 pivotally depend at one end from the front portion of the seat frame 16 on a horizontal pivot 40 and carry a lower transverse pivot 42 at their opposite ends. A front transverse member 44 is pivotally mounted on the front pivot 42 between the links 38 and is connected to the upper edges 34 and 36 of the channel-shaped member 26 to pivotally support the front end of the seat on the movable member 26. A pair of rear links 46 are also pivotally connected at one end to the seat frame 16 on transverse pivots 48 and carry a second transverse pivot 50 at their other end. A rear transverse member 52 swingably depends from the pivots 50 and also engages the channel-shaped member 26 to support the rear portion of the seat 14 on the channel-shaped member. As is apparent from FIG. 1, the links 38 and 46 in conjunction with the seat frame 16 and the channel-shaped member 26 roughly form a parallel-link-type suspension whereby the seat 14 is free to move in a generally vertical direction. However the movement of the seat is limited by a combined shock absorbing and coil spring unit 54 which is connected to the link 46 by means of a transverse member 56 and to the seat frame 16 at 58, the unit 54 providing a resilient support for the seat 14. An adjusting mechanism 60 which interconnects the unit 54 and the transverse member 56 provides an adjustment whereby the amount of resiliency can be varied according to the weight of the operator.

The seat 14 is shown in its normal operating position in FIG. 1 and is maintained in this position by a latch means 61, only the handle portion of which is shown. By releasing the latch means 61, the seat my be swung upwardly and rearwardly about the pivots 50 and 42 so that it does not interfere with the operator during stand-up operation of the vehicle.

The channel-shaped member 26 has an elongated fore-and-aft slot 62 through its horizontal bight portion 28, the slot 62 having front and rear ends 64 and 66 respectively. A pair of pins or bolts 68 and 70, having heads 72 and 74 respectively at one end, extend through the slot 62 and have their other ends attached to the supporting structure 10 between the rails 12, a substantial clearance between the heads 72 and 74 and the channel-shaped member 26 being provided. The fore-and-aft movement of the channel-shaped member 26 is thus limited by the opposite ends 64 and 66 of the slot 62 engaging the pins 68 and 70 respectively.

A relatively flat locking element or member 76 is mounted on the horizontal bight portion 28 of the channel-shaped member 26 between the pin heads 72 and 74 and the member 26. The locking member 76 includes a front half 78, having a rearward hook portion 80, and a rear half 82, having a forward hook portion 84 which meshes with the hook portion 80 to form a transverse aperture above the channel-shaped member 26 and below the locking member 76.

When the locking member 76 rests flush against the horizontal bight portion 28, there is a relatively small clearance between the bolt heads 72 and 74 and the upper surface of the locking member 76, whereby the channel-shaped member 26 is free to slide in a fore-and-aft direction relative to the locking member 76, the locking member being held against fore-and-aft movement by the pins 68 and 70. When the hook portions 80 and 84 are raised, raising the locking member 76 between the pins 68 and 70, as shown in FIG. 2, the opposite fore-and-aft ends of the locking member 76 are forced against the horizontal bight portion 28 of the channel-shaped member, the pin heads 72 and 74 engaging the upper surface of the locking member halves 78 and 82 and functioning as fulcrums.

The upward movement of the locking member is provided by a cam means, indicated generally by the numeral 86, which includes a substantially cylindrical axially transverse cam member 88 extending through the transverse opening formed by the hook portions 80 and 84. The cam member 88 has a pair of flats or transverse grooves 90 and 92 at opposite ends, respectively engaging the upper edges 34 and 36 of the channel-shaped member when the locking member 76 is in its lower or unlocking position as shown in FIG. 1. When the cam member 88 is rotated as shown in FIG. 2, the upper edges 34 and 36 leave the flats 90 and 92 and engage the outer cylindrical surface of the cam member 88, raising the cam member and the locking member 76. The cam member is rotated by a handle 94 which is easily manipulated by the operator sitting on the vehicle seat 14. The clockwise rotation of the handle 94, and consequently of the cam member 88, is limited by a forward stop 96, which is attached to the handle 94 and engages the upper edge 34 of the member 26 when the locking member 76 is in its unlocked position, as shown in FIG. 1. The counterclockwise rotation of the handle 94, and consequently of the cam member 88, is also limited by a rear stop 98, which is attached to the handle 94 and engages the edge 34 when the cam member 88 and the locking member 76 are in their locked position, as shown in FIG. 2.

In operation, the locking member is normally maintained in its locked position as shown in FIG. 2, wherein the locking member 76 frictionally engages the channel-shaped member 26 to prevent fore-and-aft movement of the channel-shaped member and the vehicle seat 14 mounted thereon. If fore-and-aft adjustment of the seat 14 is desired to change the distance between the seat 14 and the vehicle controls, the handle 94 is rotated in a clockwise direction until the stop 96 engages the edge 34, as shown in FIG. 1, thereby rotating the cam member 88 until the flats 90 and 92 rest on the edges 34 and 36, lowering the locking member 76 until it fits flush against the channel-shaped member 26, providing a clearance between the pin heads 72 and 74 and the locking member 76. Since, in this condition, there is no force urging the locking member 76 against the channel-shaped member 26, the member 26 is free to move relative to the locking member to establish a new fore-and-aft position of the seat 14. When the new position is obtained, the operator merely rotates the handle 94 to its locking position as shown in FIG. 2.

It is to be understood that the locking device can be utilized on other types of seat construction and other types of mounting mechanisms wherein fore-and-aft adjustment of the seat is provided. Moreover, other features and advantages of the present invention will readily occur to those skilled in the art as will many modifications and alterations in the preferred embodiment of the invention described herein, all of which may be achieved without departing from the spirit and the scope of the invention.

What is claimed is:

1. A locking device for comprising: a supporting structure; an elongated movable member mounted on the supporting structure for movement relative thereto in the direction of elongation and having a slot elongated in the direction of relative movement; a pin extending through said slot, having one end attached to the supporting structure, and having a head at the other end spaced from said movable member, the movement of said movable member being limited by the pin engaging an end of said slot; a locking member mounted between said pin head and said movable member and movable between an unlocked position wherein clearance is provided between the locking member and the pin head and the movable member is slidable relative to said locking member, and a locking position wherein the locking member operably engages the pin head and the movable member to prevent relative movement between said pin and said movable member; and manually-actuated cam means operably engaging the locking member for moving the locking member between its locking and unlocking positions.

2. The invention defined in claim 1 wherein the movable member is relatively flat on opposite sides of said slot and the locking member is also relatively flat and mounted on the movable member in a laminar sliding relationship in its unlocking position, part of the locking member being transversely deflected away from the movable member by the cam means to engage said pin head in its locking position.

3. In a vehicle seat structure having support means and a seat carried above the support means on a movable member for movement therewith in a rearwardly and upwardly or forwardly and downwardly direction relative to said support means, the combination therewith of locking means for releasably locking the moveable member to the supporting structure, comprising: a fore-and-aft elongated slot through said movable member; a pin means extending through said slot and having one end attached to said supporting structure; a locking member movable between a locking position wherein it frictionally connects the pin means and the movable member to lock the pin means and the movable member against relative movement and an unlocking position wherein it permits said relative movement; and cam means manually actuatable by a rider on said seat and operably connected to said locking member to move said locking member between its alternate positions.

4. A vehicle seat structure comprising: a fore-and-aft supporting structure; a movable member slidably mounted on the supporting structure for limited fore-and-aft movement; a seat disposed above the supporting structure; linkage means connecting the seat to the movable member for movement therewith and also providing seat movement relative to the movable member between a rider-carrying position and a rearward non-operative position; a locking member movable between a locking position wherein it operably connects and locks the movable member to the supporting structure in any of the infinitely variable fore-and-aft positions of the movable member relative to the supporting structure and an unlocking position wherein it permits movement of the movable member on the supporting structure; and manually-actuated cam means operably connected to the locking member for moving it between its alternate positions.

5. The invention defined in claim 4 in which the movable member has an elongated fore-and-aft slot and the supporting structure carries pin means extending through the slot, the fore-and-aft movement of said movable member being limited by said pin means engaging the opposite ends of said slot, the locking member operably connecting said pin means and said movable member in its locking position and disconnecting sad pin means and said movable member in its unlocking position.

6. The invention defined in claim 5 in which the supporting structure includes fore-and-aft upwardly and rearwardly inclined rail means and the movable member is slidable upwardly and rearwardly and downwardly and forwardly on said rail means.

7. The invention defined in claim 6 in which the pin means includes a pair of spaced pins, having one end attached to the supporting structure and having heads at their opposite ends and further characterized by the locking member engaging said pin heads in its locking position and clearing said pin heads in its unlocked position.

8. The invention defined in claim 7 in which the movable member includes a relatively flat portion on opposite sides of said slot and the locking member is also relatively flat and mounted on the flat portion of the movable member in a laminar, sliding relationship in its unlocked position and the cam means deflects a portion of the locking member between said pins away from the movable member in said locking position forcing a second portion of the locking member against said movable member.

9. The invention defined in claim 8 in which the cam means is connected to the supporting structure and is actuated by a handle manually operable by a rider on said seat.

10. The invention defined in claim 9 wherein the movable member includes a fore-and-aft channel-like member open upwardly, the bight portion engaging said rail means and further characterized in that the cam means includes a cam member connected to the locking member, rotatable about a transverse axis and having cam surfaces slidable on and operably engaging the upper edges of said channel-like member to move the cam member and the locking member relative to the channel-like member in response to rotation of the cam member upon its axis.

References Cited

UNITED STATES PATENTS

| | | | |
|---|---|---|---|
| 1,921,224 | 8/1933 | Floraday | 248—429 |
| 2,149,946 | 3/1939 | Whedon et al. | 248—429 |
| 2,840,140 | 6/1958 | Harrington | 248—430 X |
| 3,284,134 | 11/1966 | Malitte | 297—329 |

FOREIGN PATENTS

| | | |
|---|---|---|
| 1,369,343 | 7/1964 | France. |
| 524,947 | 8/1940 | Great Britain. |

ROY D. FRAZIER, *Primary Examiner.*

CLAUDE A. LE ROY, *Examiner.*

ROBERT P. SEITTER, *Assistant Examiner.*